United States Patent
Li et al.

(10) Patent No.: US 7,244,513 B2
(45) Date of Patent: Jul. 17, 2007

(54) STAIN-ETCHED SILICON POWDER

(75) Inventors: Yunjun Li, Austin, TX (US); Igor Pavlovsky, Austin, TX (US)

(73) Assignee: Nano-Proprietary, Inc., Austin, TX (US)

( * ) Notice: Subject to any disclaimer, the term of this patent is extended or adjusted under 35 U.S.C. 154(b) by 102 days.

(21) Appl. No.: 10/371,971

(22) Filed: Feb. 21, 2003

(65) Prior Publication Data

US 2004/0166319 A1 Aug. 26, 2004

(51) Int. Cl.
*B32B 5/16* (2006.01)
(52) U.S. Cl. .................. 428/613; 428/402; 428/403
(58) Field of Classification Search ............... 428/402, 428/403, 613; 423/348
See application file for complete search history.

(56) References Cited

U.S. PATENT DOCUMENTS

| | | | | |
|---|---|---|---|---|
| 3,923,563 | A * | 12/1975 | Venkatu | 438/567 |
| 4,092,445 | A * | 5/1978 | Tsuzuki et al. | 438/510 |
| 4,532,700 | A * | 8/1985 | Kinney et al. | 438/409 |
| 5,156,896 | A * | 10/1992 | Katoh et al. | 428/81 |
| 5,277,769 | A * | 1/1994 | Medernach | 438/14 |
| 5,338,415 | A * | 8/1994 | Sailor et al. | 205/645 |
| 5,360,759 | A * | 11/1994 | Stengl et al. | 438/510 |
| 5,397,429 | A * | 3/1995 | Hummel et al. | 216/24 |
| 5,421,958 | A * | 6/1995 | Fathauer et al. | 216/48 |
| 6,380,550 | B1 * | 4/2002 | Canham et al. | 257/3 |
| 6,398,943 | B1 * | 6/2002 | Arens-Fischer et al. | 205/666 |
| 6,790,785 | B1 * | 9/2004 | Li et al. | 438/745 |
| 6,929,950 | B2 * | 8/2005 | Canham et al. | 435/459 |
| 2003/0170280 | A1 * | 9/2003 | Canham et al. | 424/401 |
| 2004/0166319 | A1 * | 8/2004 | Li et al. | 428/404 |
| 2006/0251562 | A1 * | 11/2006 | Farrell et al. | 423/324 |

OTHER PUBLICATIONS

Heinrich et al, "Luminescent Colloidal Silicon Suspension from Porous Silicon", Science, vol. 255, 1992, pp. 66-68.*
Singh et al, "Quenching and recovery of photoluminescence intensity of silicon nanoparticles embedded in optically transparent polymers", Semicond. Sci. Technol. 17 No. 10 (Oct. 2002) 1123-27.*
Credo et al., "External quantum efficiency of single porous silicon nanoparticles", Applied Physics Letters, vol. 74, No. 14, pp. 1978-1980, 1999.*
R. W. Fathauer et al., "Visible Luminescence from Silicon Wafers Subjected to Stain Etches," *Applied Physics Letters*, vol. 60, No. 8, Feb. 24, 1992, pp. 995-997.
R. E. Hummel et al., "Novel Technique for Preparing Porous Silicon," *Applied Physics Letters*, vol. 61, No. 16, Oct. 19, 1992, pp. 1965-1967.

(Continued)

*Primary Examiner*—H. Thi Le
(74) *Attorney, Agent, or Firm*—Fish & Richardson P.C.; Kelly Kordzik

(57) ABSTRACT

The present invention is for a porous silicon powder comprising silicon particles wherein the outermost layers of said particles are porous. The present invention is also directed to a method of making this porous silicon powder using a stain etch method. The present invention is also directed to a method of making silicon nanoparticles from the porous silicon powders using a process of ultrasonic agitation. The present invention also includes methods of processing these silicon nanoparticles for use in a variety of applications.

8 Claims, 4 Drawing Sheets

OTHER PUBLICATIONS

J. N. Kidder, Jr. et al., "Comparison of Light Emission from Stain-Etch and Anodic-etch Silicon Films," *Applied Physics Letters*, vol. 61, No. 24, Dec. 14, 1992, pp. 2896-2898.

Song Tong et al., "Visible Electroluminescence from Nanocrystallites of Silicon Films Prepared by Plasma Enhanced Chemical Vapor Deposition," *Applied Physics Letters*, vol. 69, No. 5, Jul. 29, 1996, pp. 569-598.

D. M. Tanenbaum et al., "Nanoparticle Deposition in Hydrogenated Amorphous Silicon Films During rf Plasma Deposition," *Applied Physics Letters*, vol. 68, No. 12, Mar. 18, 1996, pp. 1705-1707.

G. M. Credo et al., "External Quantum Efficiency of Single Porous Silicon Nanoparticles," *Applied Physics Letters*, vol. 74, No. 14, Apr. 5, 1999, pp. 1978-1980.

M. H. Nayfeh et al., "Second Harmonic Generation in Microcrystallite Films of Ultrasmall Si Nanoparticles," *Applied Physics Letters*, vol. 77, No. 25, Dec. 18, 2000, pp. 4086-4088.

M. L. Ostraat et al., "Synthesis and Characterization of Aerosol Silicon Nanocrystal Nonvolatile Floating-Gate Memory Device," *Applied Physics Letters*, vol. 79, No. 3, Jul. 16, 2001, pp. 433-435.

J. D. Fowlkes et al., "Surface Microstructuring and Long-Range Ordering of Silicon Nanoparticles," *Applied Physics Letters*, vol. 80, No. 20, May 20, 2002, pp. 3799-3801.

C. Lam et al., "Large-Scale Synthesis of Ultrafine Si Nanoparticles by Ball Milling," *Journal of Crystal Growth*, 220 (2000), pp. 466-470.

Mikito Marniya et al., "Crystallization of Fine Silicon Particles from Silicon Monoxide," *Journal of Crystal Growth*, 237-239 (2002), pp. 1909-1914.

Markus Ehbrecht et al., "Gas-Phase Characterization of Silicon Nanoclusters Produced by Laser Pyrolysis of Silane," *Physical Review B*, vol. 59, No. 4, Jan. 15, 1999, pp. 2975-2985.

Y. S. Tsuo et al., "Environmentally Benign Silicon Solar Cell Manufacturing," National Renewable Energy Laboratory, Presented at the 2nd World Conference and Exhibits on Photovoltaie Solar Energy Conversion, Jul. 6-10, 1998, Vienna, Austria, 7 pp.

\* cited by examiner

STAIN-ETCHED SILICON POWDER

TECHNICAL FIELD

The present invention relates in general to materials science, and in particular, to nanostructured materials and nano-size particles, and methods for making same.

BACKGROUND INFORMATION

1. Methods of Making Porous Silicon

Porous silicon is a material formed on a surface of bulk silicon by forming multiple nanometer-sized pores using a chemical or electrochemical etching process. A standard electrochemical technique for making such porous silicon is the anodization of silicon. Anodization involves the application of a potential to a bulk silicon sample (e.g., a silicon wafer). For this anodization process, the wafer is immersed in an electrolyte (etching solution) which is commonly a mixture of hydrofluoric acid, water and other components. The anodization process requires a continuous and conducting sample of silicon so that it can be immersed in an electrolyte and a positive potential can be applied (Canham, *Appl. Phys. Lett.*, 57, 1046 (1990)). This standard anodization technique is not, however, capable of producing porous silicon powder due to the inability of establishing electrical contact between particles.

It would be beneficial to have a material with a large specific surface area with respect to the weight of bulk silicon, and which also has a porous layer. An example of such a material is silicon powder with a layer or layers of porous silicon covering the surface of the particles which make up the powder. Such a porous silicon powder would have a much greater porosity-to-weight ratio than an anodized silicon wafer surface. Standard anodization techniques are not, however, capable of making such a porous silicon powder.

2. Methods of Making Silicon Nanoparticles

There are a number of methods currently known for making silicon nanoparticles. These include furnace (Ostraat et al., *Appl. Phys. Lett.* 79, 433 (2001)) and laser-assisted pyrolysis of silane (Ehbrecht et al., *Phys. Pev. B* 59, 2975 (1999)), spark processing (Hummel et al., *Appl. Phys. Lett.* 61, 1965 (1992)), plasma-enhanced chemical vapor deposition (PE CVD) with hydrogen-diluted silane (Tong et al., *Appl. Phys. Lett.* 69, 596 (1996)), ball milling (Lam et al., *J Cryst. Growth* 220, 466 (2000)), laser ablation (Fowkles et al., *Appl. Phys. Lett.* 80, 3799 (2002)), thermal evaporation, RF plasma deposition (Tanenbaum et al., *Appl. Phys. Lett.* 68, 1705 (1996)), SiO disproportionation (Mamiya et al., *J. Cryst. Growth* 237–239, 1909 (2002)), and dispersion of a porous silicon layer (Nayfeh et al., *Appl. Phys. Lett.* 77, 4086 (2000); Credo et al., *Appl. Phys. Lett.* 74, 1978 (1999)). Most of these methods require either expensive equipment with high maintenance costs and/or they provide relatively low yield, considerably limiting the use of these materials for applications that require bulk quantities.

Among the aforementioned methods, the technique of dispersion of nanoparticles from a porous anodized silicon layer is merely one of the most cost-effective, since it requires simple equipment to produce silicon quantum dots (QDs). However, the product yields by this method are low. It is estimated that approximately one monolayer of nanoparticles is obtained from a porous layer formed on a single wafer surface (Nayfeh et al.; Credo et al.). Thus, the yield (mass efficiency) per run in this method is only about $10^{-5}$–$10^{-6}$ of the mass of the precursor material (silicon wafer) which makes this approach practically unusable for mass production.

A method of creating silicon nanoparticles from a porous silicon powder using the dispersion techniques described above would be deemed advantageous in that larger quantities of the silicon nanoparticles could be generated much more efficiently. This would provide for an increased level of availability and a corresponding increase in their use for research, industrial, and consumer product applications.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention is directed towards a porous silicon (Si) powder comprising silicon particles, wherein the outermost layers of said particles are porous. The present invention is also directed towards a method of making this porous silicon powder. The method of creating such porous powders involves treating the silicon particles making up a silicon powder with an electroless chemical etching technique known as stain-etching.

Stain-etching of silicon is known to create a porous morphology within the outermost (i.e., surface) layers of a silicon surface (Fathauer et al., *Appl. Phys. Lett.*, 60, 995 (1992); Kidder et al., *Appl. Phys. Lett.* 61, 2896 (1992), both of which are incorporated herein by reference). As in the case of silicon anodization, stain-etching produces nanometer-sized pores or, depending upon the specific etch conditions, nanopillars in bulk Si material. Stain-etching of silicon involves the use of hydrofluoric acid and compounds that produce $NO_2$.

Figure 1:
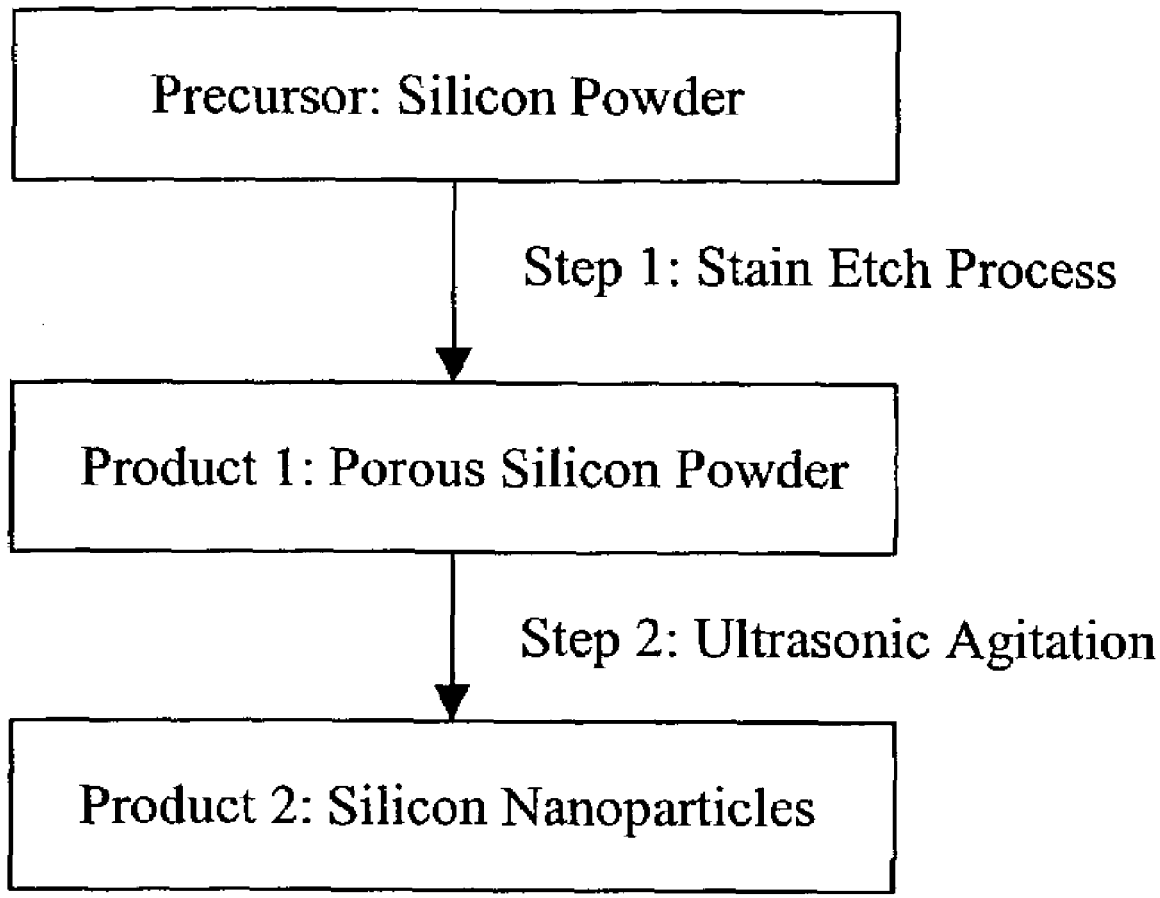
FIG. 1 illustrates a manner in which the various aspects of the present invention are interrelated.

The present invention is also directed towards a method of forming silicon nanoparticles by ultrasonically treating the stain-etched powder described above. During the ultrasonication treatment, silicon nanoparticles are formed from silicon pillars as a consequence of the mechanical interaction of ultrasonically-generated cavitation bubbles with the porous surface layers of the micron-sized particles comprising the porous powder. This process is shown schematically in FIG. 1. Here, silicon powder (Precursor) is subjected to a stain-etch process (Step 1) to form a porous silicon powder (Product 1). Said porous silicon powder is then subjected to an ultrasonic agitation process (Step 2) to form silicon nanoparticles (Product 2).

As the present invention is also directed towards methods of using silicon nanoparticles, size separation of nanoparticles may be needed if size-dependent optical properties are involved and used in an application, typical examples of which can be fluorescent tagging and optoelectronics. Thus, some embodiments of the present invention employ size separation techniques which include, but are not limited to, centrifugation, filtration, nanosieving, size-exclusion chromatography, and combinations thereof.

The current invention presents a significant advantage over the anodization technique in that it allows for using powders instead of solid silicon wafers. This enables the etching of a much higher surface area per gram of the material. Also, unlike most other methods, it can produce nanoparticles doped with any type of dopant (n-type, p-type, etc.) if appropriately-doped silicon is used as a precursor material. The silicon nanoparticles produced in this manner are highly crystalline and have a level of crystallinity which is independent of the size of the nanoparticle.

Figure 2:
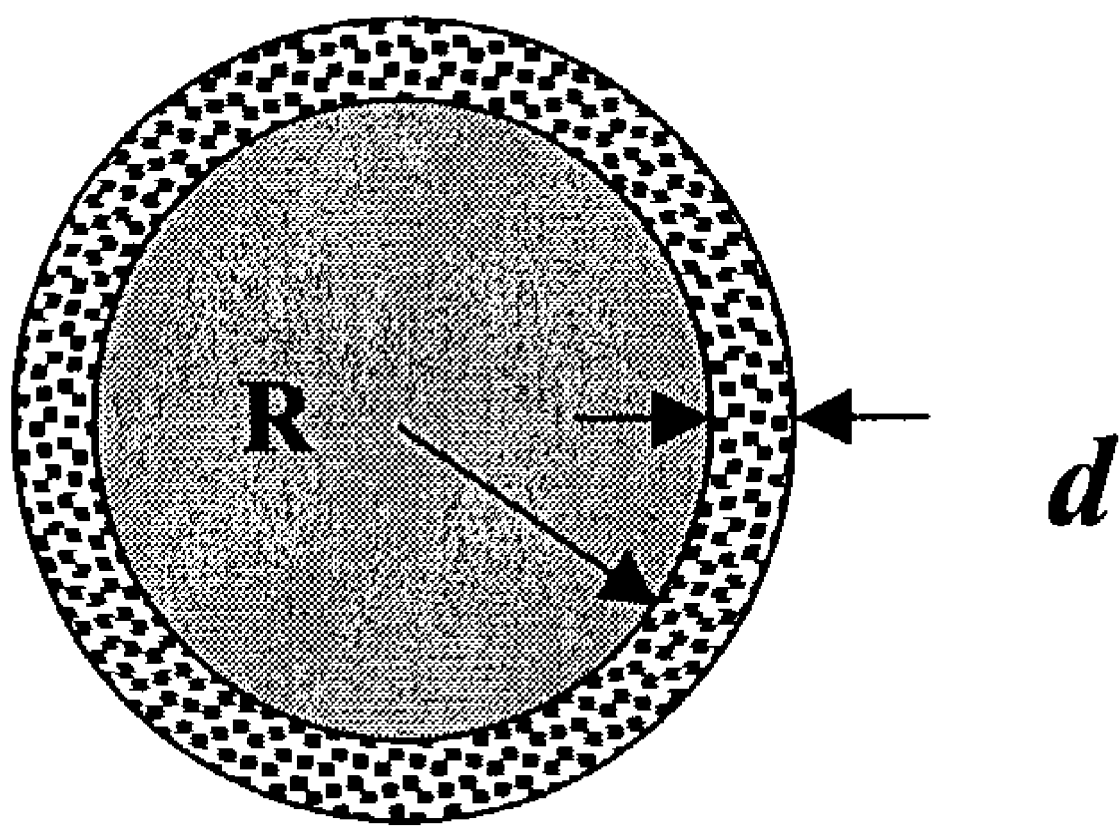
FIG. 2 illustrates a microparticle with a porous layer d.

The advantage of using powders instead of silicon wafers to produce silicon nanoparticles according to the dispersion method can be understood from the following estimation. A typical 4-inch diameter silicon wafer with a thickness of 0.5 mm and a density of 2.33 g/cm$^3$ weighs approximately 9.5 grams. One-sided anodization will ideally produce a porous layer over an area of 81 cm$^2$, yielding a specific surface area available for anodization of 8.6 cm$^2$/g. By comparison, five-micron-diameter (5 μm) spherical particles of the same weight have a total surface area of 2.43×10$^4$ cm$^2$, or a specific area of 2.57×10$^3$ cm$^2$/g, which increases as 1/R as the particle gets smaller, where R is the radius of the microparticle. Thus, depending on the average size of the particles, an advantage of two to three orders of magnitude in the surface area available for etching can be gained from using stain-etched silicon powder. Mass efficiency of this method can be estimated as follows:

Referring to FIG. 2, given a microparticle of radius R and porous layer thickness d, and with the approximation of R>>d, the volume of the porous layer is given by $$V=4\pi R^2 d$$

If a porosity p of the layer ranges from 50% to 75%, the volume of silicon nanostructures in the porous layer will be $$V=4\pi R^2 d(1-p).$$

Assuming that, during the ultrasonication process, the porous silicon layer is entirely consumed to form silicon nanoparticles, the relative volume of nanoparticles with respect to the volume of precursor will be $$\delta=dV/V_R=4\pi R^2 d(1-p)/(4/3)\pi R^3=3(1-p)d/R\approx d/R.$$

This means that, for the processing of silicon microparticles having diameters of a few micrometers, the mass efficiency δ of such a method which produces nanoparticles with a size at which quantum confinement effects play a significant role in the optical properties of the nanoparticles, is about 10$^{-3}$. To improve the parameter δ, one would simply stain-etch silicon microparticles of smaller size.

Stain-etching is typically performed in an aqueous mixture of hydrofluoric and nitric acids. The reaction process can be described as:

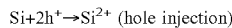

Si+2h$^+$→Si$^{2+}$ (hole injection)

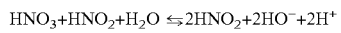

HNO$_3$+HNO$_2$+H$_2$O ⇌ 2HNO$_2$+2HO$^-$+2H$^+$

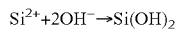

Si$^{2+}$+2OH$^-$→Si(OH)$_2$

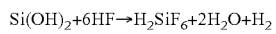

Si(OH)$_2$+6HF→H$_2$SiF$_6$+2H$_2$O+H$_2$ wherein the regeneration of HNO$_2$ makes the reaction autocatalytic and where the etching rate has been reported to depend upon the amount of NO$_2$ formed in the reaction

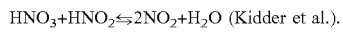

HNO$_3$+HNO$_2$⇌2NO$_2$+H$_2$O (Kidder et al.).

Thus, the process is limited by the presence of HNO$_2$ at the surface of the silicon sample.

A quiescent period of several minutes (incubation time) exists between the immersion of the sample and the staining reaction (Kidder et al.). In light of this, properly chosen nitrates or nitrites can substitute for nitric acid in this reaction.

In some embodiments of the present invention, a method of stain-etching silicon powders is employed that uses iron nitrate Fe(NO$_3$)$_3$. The incubation time in this reaction is less than 2–4 minutes, and can be decreased to a few seconds by a known technique (Kidder et al.).

Figure 3:
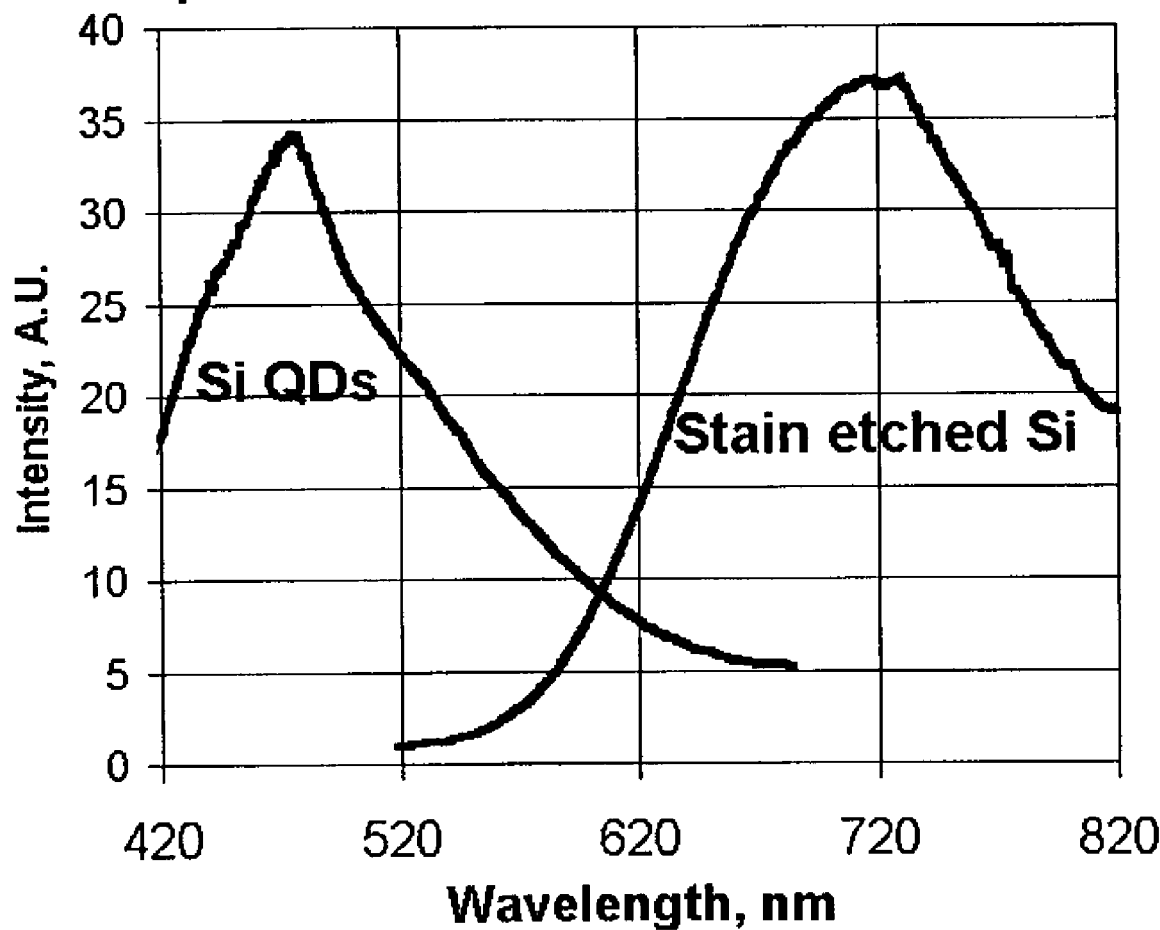
FIG. 3 illustrates photoluminescence spectra of silicon quantum dots (QD) (left) and stain etched bulk silicon (right)

Both stain-etched silicon powder and silicon nanoparticles have strong photoluminescence in the visible range. Photoluminescence (PL) in the orange-red region of the visible spectrum is common for stain-etched and anodized porous silicon, and is reportedly believed to originate from surface termination related states (Fathauer et al.; Kidder et al.). In the case of nanoparticles, however, the PL band is different and appears in the blue-green region of the visible spectrum. Its position changes within this range with respect to certain filtering and sonication procedures indicating a dependence of the PL characteristics on the size of the nanoparticles which is consistent with the quantum confinement (QC) model of the photoluminescence. FIG. 3 shows the difference in two PL features for stain-etched silicon (right) and silicon quantum dots (quantum dots being silicon particles that are quantum-confined as a result of having a diameter that is comparable to, or less than, the Bohr exciton radius of silicon). In spite of the fact that the red PL is not necessarily related to the nanoparticles and not observed for bulk silicon, this PL feature is a good indication of the presence of nanostructured material formed on the etched silicon surface.

Exemplary embodiments of making porous silicon powders, according to embodiments of the present invention, comprise: a) providing a quantity of silicon powder comprising a plurality of silicon particles, and b) etching said silicon particles using a stain-etch process. Many variations exist including adding an optional process for making the silicon powder comprising: a) providing a bulk silicon object, b) grinding the bulk silicon object into smaller pieces, c) ball milling the smaller silicon pieces into a silicon powder comprised of a plurality of silicon particles, and, optionally, sieving the powder to generate powders comprising silicon particles with narrower size distributions.

In some embodiments of the present invention, the silicon powder ranges generally in size from at least about 10 nanometers (nm) to at most about 1 millimeter (mm), and more specifically from at least about 1 micrometer (μm) to at most about 1 mm. In some embodiments, the silicon powder has a purity which ranges generally from at least about 80 percent to at most about 100 percent, specifically from at least about 95 percent to at most about 100 percent, and more specifically from at least about 98 percent to at most about 100 percent. In some embodiments, the silicon powder is doped. In some embodiments, the silicon powder is n-doped, p-doped, or combinations thereof. In some embodiments, the silicon powder is doped with a species selected from the group consisting of arsenic (As), gallium (Ga), phosphorus (P), boron (B), antimony (Sb), erbium (Er), and combinations thereof.

In some embodiments of the present invention, the stain-etch process comprises treatment of silicon powder with a mixture of hydrofluoric acid and a nitro-containing species. Such a process generates pores in the outermost layers of the silicon particles making up the powder. In some embodiments, this mixture of hydrofluoric acid and a nitro-containing species is in solution, and in some embodiments, that solution is aqueous in nature. The nitro-containing species can be any nitro-containing species which suitably provides for a nitro-containing species according to the present invention and includes, but is not limited to, nitric acid, iron nitrate, nitrous acid, cobalt nitrate, nickel nitrate, sodium nitrate, potassium nitrate, and combinations thereof.

In some embodiments of the present invention, the stain-etch process has a quiescent period which can range generally in duration from at least about 1 second to at most about 60 minutes, specifically from at least about 10 seconds to at most about 40 seconds, and more specifically from at least about 1 minute to at most about 20 minutes. In some embodiments, the stain-etch process has a rate that can be monitored by nitrogen dioxide ($NO_2$) evolution. In some embodiments, the stain-etch process, while an exothermic reaction, has a rate which can be modulated by temperature control, the reaction temperature ranging generally from at least about 0° C. to at most about 100° C., specifically from at least about 0° C. to at most about 80° C., and more specifically from at least about 10° C. to at most about 40° C. In some embodiments, the stain-etch process has a rate which is modulated by hydrofluoric acid and nitro-containing species concentration. In some embodiments, the stain-etch process can be modulated by selection of a particular nitro-containing species, which can also affect the duration of the quiescent period. In some embodiments, illumination is used to enhance the rate of the stain-etch process. Illumination, according to the present invention, can be any incident radiation that suitably enhances the rate of the stain-etch process and includes, but is not limited to, near infrared, visible, near ultraviolet, far ultraviolet, extreme ultraviolet, and combinations thereof. Depending on the etch rate and the degree of porosity desired in the powder, the etching process can have a duration which ranges generally from at least about 1 second to at most about 5 hours, specifically from at least about 10 seconds to at most about 2 hours, and more specifically from at least about 5 minutes to at most about 1 hour.

The present invention is directed towards a porous silicon powder comprising a plurality of silicon particles (and made according to the aforementioned method) wherein the outermost layers of said particles are porous. Outermost layers, according to the present invention, comprise the surface atomic layer and up to greater than about a few thousand additional atomic layers. In terms of thickness, the outermost layers comprise a thickness which ranges generally from at least about 1 angstrom (100 picometers) to at most about 500 nanometers, specifically from at least about 1 nanometer to at most about 200 nanometers, and more specifically from at least about 5 nanometers to at most about 200 nanometers.

The silicon powder, according to some embodiments of the present invention, comprises silicon particles which range generally in size from at least about 1 nanometer to at most about 1 millimeter, specifically from at least about 10 nanometers to at most about 1 millimeter, and more specifically from at least about 1 micrometer to at most about 1 millimeter. Before etching, these silicon particles comprise a surface area to mass ratio which ranges generally from at least about 20 $cm^2/g$ to at most about $2\times10^6$ $cm^2/g$, and specifically from at least about 20 $cm^2/g$ to at most about $2\times10^4$ $cm^2/g$. In some embodiments of the present invention, the outermost porous layers of said silicon particles, when stain-etched, comprise a thickness which ranges generally from at least about 1 angstrom (100 picometers) to at most about 500 nanometers, specifically from at least about 1 nanometer to at most about 500 nanometers, and more specifically from at least about 1 nanometer to at most about 5 nanometers. When stain-etched, the outermost porous layers of said silicon particles comprise pores which range in size from at least about 1 nanometer to at most about 100 nanometers, and they comprise a porosity which ranges generally from at least about 5 percent to at most about 95 percent, and specifically from at least about 10 percent to at most about 90 percent.

The porous silicon powder can have a purity which ranges generally from at least about 80 percent to at most about 100 percent, specifically from at least about 95 percent to at most about 100 percent, and more specifically from at least about 98 percent to at most about 100 percent. In some embodiments of the present invention, the porous silicon powder comprises a dopant species which can be present in the porous silicon particles in an amount which ranges from at least about $1\times10^{-7}$ weight percent to at most about 1 weight percent. In some embodiments the porous silicon particles are p-doped, in others they are n-doped, and in still others, they possess a combination of the two. Other dopant species, according to the present invention, which may or may not contribute to the n- or p-doping include, but are not limited to As, Ga, B, P, Sb, Er, and combinations thereof.

The present invention is also directed toward a method of making silicon nanoparticles. In exemplary embodiments of the present invention, silicon nanoparticles are made by providing a plurality of the porous silicon powder (described above), and ultrasonically agitating this powder in a suitable solvent which causes the porous outermost layers to break up and be dispersed into the solvent. This solvent can be any solvent which suitably provides for the generation of silicon nanoparticles according to the present invention. Exemplary solvents include, but are not limited to, water, methanol, acetonitrile, dimethylformamide, ethanol, toluene, propanol, and combinations thereof.

The porous silicon powder used to make the silicon nanoparticles of the present invention can be any variation of the porous silicon powder previously described above. The silicon nanoparticles are generated by a mechanical action between the porous silicon layers of the powder and cavitation bubbles induced by ultrasonic agitation. Ultrasonic agitation can be caused by ultrasonic waves which have a frequency which ranges from at least about 10 kilohertz (KHz) to at most about 10 megahertz (MHz), the higher end of this range representing what some practitioners in the art would refer to as megasonic frequency. For the purposes of this invention, it will be understood that the term ultrasonic assistance comprises treatment with sonic waves within this entire frequency range. The duration of this ultrasonic assistance can range generally from at least about 10 seconds to at most about 10 hours, specifically from at least about 1 minute to at most about 4 hours, and more specifically from at least about 10 minutes to at most about 1 hour. Silicon nanoparticles produced according to this process have diameters which range from at least about 1 nanometer to at most about 100 nanometers.

In some embodiments of the present invention, centrifugation is used to separate the silicon nanoparticles from remnants of the larger silicon particles. In some embodiments, filtration is used to separate the silicon nanoparticles from remnants of the larger silicon particles, and in some embodiments, a combination of centrifugation and filtration is used. In some embodiments, filtration is used to separate silicon nanoparticles from other silicon nanoparticles having different sizes or a different range of sizes. This permits the isolation of quantities of silicon nanoparticles with very narrow size distributions and possessing unique photoluminescence properties as described herein.

In some embodiments of the present invention, a dispersal agent is added to the suspension of porous silicon particles prior to, during, or prior to and during the ultrasonic agitation process to facilitate dispersion. Suitable dispersal agents can be any species which suitably facilitates the dispersal and/or the continued suspension of the produced silicon nanoparticles in a solvent or suspending medium. Suitable dispersal agents include, but are not limited to, polyelectrolytes, surfactants, and combinations thereof. Suitable surfactants comprise cationic surfactants, anionic surfactants, neutral surfactants, and combinations thereof.

The present invention is also directed toward a method of using these silicon nanoparticles in a variety of applications which include, but are not limited to, floating gate memory devices, sensors, display materials, fluorescent tagging, biophysics, and combinations thereof.

This method of stain-etching powders and forming nanoparticles from them can be used in analogous systems. Examples of possible materials include, but are not limited to, cadmium sulfide, cadmium selenide, germaniam, and other materials commonly used to make quantum dots.

The following example is a detailed description of one particular embodiment of the present invention. The detailed description falls within the scope of, and serves to exemplify, the more generally described process set forth above. The example is presented for illustrative purposes only, and is not intended to restrict the scope of the present invention.

EXAMPLE

Bulk p-type silicon with a resistivity of 1–10 Ohm.cm was ground, ball milled, and sieved to produce a silicon powder comprising silicon particles with an average diameter of 100 micrometers. Approximately 0.1 grams of this silicon powder was placed in a flask with approximately 2 mL of an aqueous solution comprising 1 mL of 49 percent hydrofluoric acid and 1 mL of a 0.2 M solution of $Fe(NO_3)_3$ in water. Reaction conditions comprised room temperature, in air, 30 minute duration, stirring periodically every 3–5 minutes. Evolution of $NO_2$ was observed. The resulting porous silicon particles were then filtered, washed with water, and characterized with ultraviolet (UV) photoluminescence (PL) spectroscopy. Characterization revealed strong red-orange PL of the powder particles, indicating a porous layer on their surface.

Figure 4:
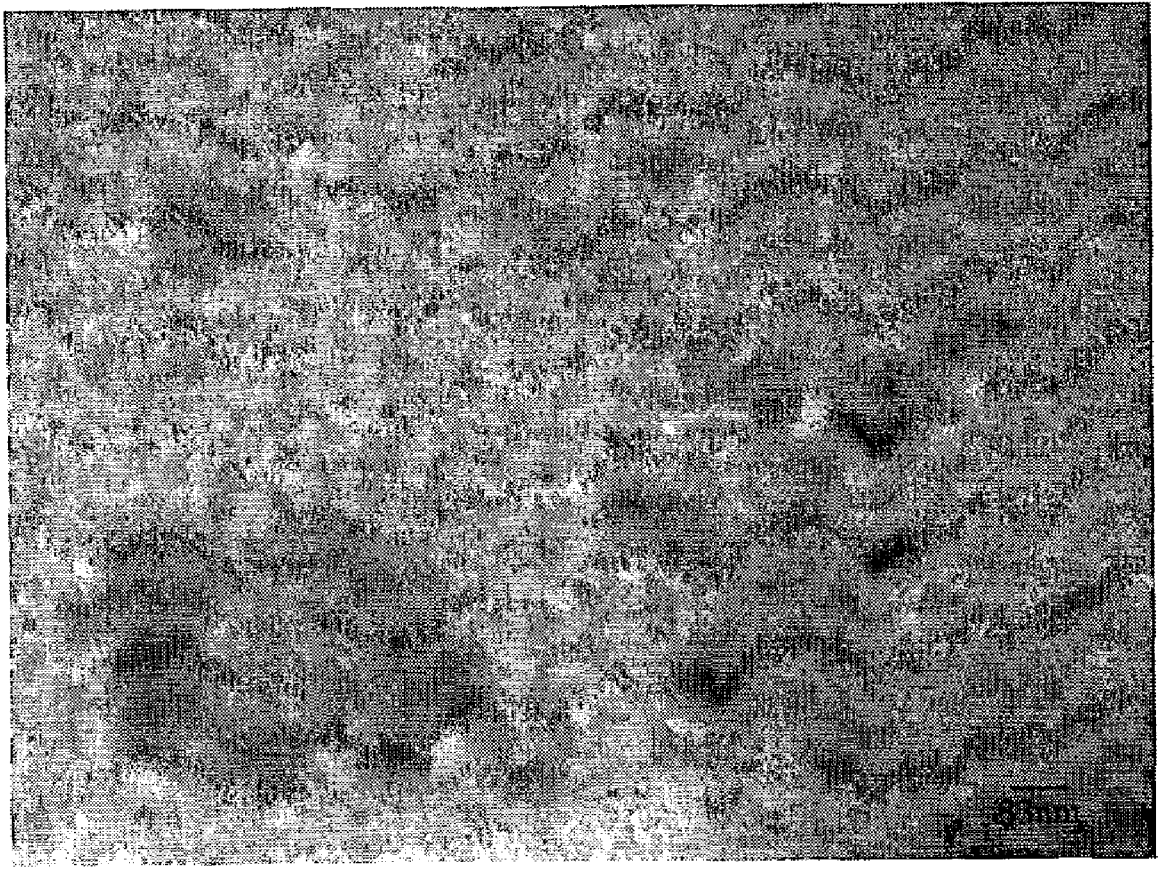
FIG. 4 illustrates a transmission electron microscopy (TEM) image of silicon nanoparticles produced by a method of the current invention.

To produce silicon nanoparticles, 0.5 grams of the porous silicon powder was redispersed in 5 mL of ethanol. This suspension was then subjected to ultrasonic agitation in the kHz range for approximately 40 minutes. The silicon nanoparticles were separated from the rest of the remaining silicon material first by centrifuging at 6000 rpm for 1 minute. The supernate containing the nanoparticles was decanted off and filtered through a 50 nm filter to further eliminate larger particles. Characterization of the silicon nanoparticles produced in this manner was done by transmission electron microscopy (TEM) which revealed nanoparticle diameters in the range of approximately 10 nanometers to approximately 50 nanometers. FIG. 4 is a representative TEM image of silicon nanoparticles produced in this way which have been centrifuged and filtered with a 50 nm membrane filter. The image reveals nanoparticles with a size of ~40 nm or less, some of them are agglomerated and form clusters (lower left).

Although this invention has been described with respect to specific embodiments, the details thereof are not to be construed as a limitation, for it will be apparent to those of skill in the art that various embodiments, changes and modifications may be resorted to without departing from the spirit and scope thereof, and it is understood that such equivalent embodiments are intended to be included within the scope of this invention.

What is claimed is:

1. A porous silicon powder comprising a plurality of silicon particles wherein only the outermost layers of said particles are porous, and wherein the outermost porous layers of said silicon particles comprise a thickness which ranges from at least about 1 angstrom to at most about 500 nanometers.

2. The porous silicon powder of claim 1, wherein the silicon particles have an average particle diameter which ranges from at least about 10 nanometers to at most about 1 millimeter.

3. The porous silicon powder of claim 1, wherein the outermost porous layers of said silicon particles comprise a porosity which ranges from at least about 5 percent to at most about 95 percent.

4. The porous silicon powder of claim 1, wherein the outermost porous layers of said silicon particles comprise pores having sizes which range from at least about 1 nanometer to at most about 100 nanometers.

5. The porous silicon powder of claim 1, wherein said powder has a purity which ranges from at least about 80 percent to at most about 100 percent.

6. The porous silicon powder of claim 1, further comprising a dopant species dispersed in the silicon particles, wherein the silicon particles serve as a matrix for the dopant species.

7. The porous silicon powder of claim 6, wherein the dopant species renders the porous silicon powder n-doped.

8. The porous silicon powder of claim 6, wherein the dopant species renders the porous silicon powder p-doped.

* * * * *